United States Patent
Kirihara et al.

(10) Patent No.: US 12,337,412 B2
(45) Date of Patent: Jun. 24, 2025

(54) LASER PROCESSING APPARATUS AND LASER PROCESSING METHOD

(71) Applicant: DISCO CORPORATION, Tokyo (JP)

(72) Inventors: Naotoshi Kirihara, Tokyo (JP); Hiroshi Morikazu, Tokyo (JP); Yohei Kaneko, Tokyo (JP); Kentaro Odanaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 149 days.

(21) Appl. No.: 18/494,242

(22) Filed: Oct. 25, 2023

(65) Prior Publication Data
US 2024/0139863 A1    May 2, 2024

(30) Foreign Application Priority Data
Oct. 27, 2022 (JP) .................................. 2022-172016

(51) Int. Cl.
*B23K 26/0622* (2014.01)
*B23K 26/36* (2014.01)

(52) U.S. Cl.
CPC .......... *B23K 26/0622* (2015.10); *B23K 26/36* (2013.01)

(58) Field of Classification Search
CPC . B23K 26/0622; B23K 26/0624; B23K 26/36
See application file for complete search history.

(56) References Cited

FOREIGN PATENT DOCUMENTS

JP        2015133437 A       7/2015

*Primary Examiner* — James Sanders
(74) *Attorney, Agent, or Firm* — Greer Burns & Crain Ltd.

(57) ABSTRACT

A laser processing apparatus includes a laser oscillating mechanism for emitting pulsed laser beams. The laser oscillating mechanism includes a group setting section for establishing the number of pulsed laser beams to be applied to a workpiece until a time after which melted debris produced by the pulsed laser beams applied to the workpiece is solidified, and assigns the pulsed laser beams to a group, under conditions that, within a period of time which is shorter than a period of time in which the melted debris is produced, and within a period of time after which a plasma generated by the pulsed laser beam becomes extinct, a next pulsed laser beam is applied to the workpiece to sustain the plasma uninterruptedly to break growing debris, and a time interval setting section for establishing a time interval between the group and another group adjacent thereto.

6 Claims, 6 Drawing Sheets

LASER PROCESSING APPARATUS AND LASER PROCESSING METHOD

BACKGROUND OF THE INVENTION

Field of the Invention

The present invention relates to a laser processing apparatus and a laser processing method for processing a workpiece with a laser beam.

Description of the Related Art

Wafers in which a plurality of devices such as integrated circuits (ICs) or large-scale integration (LSI) circuits are constructed in respective areas demarcated on their face side by a plurality of projected dicing lines are divided into individual device chips by a laser processing apparatus. The device chips produced from the divided wafers will be used in electronic appliances such as cellular phones and personal computers.

The laser processing apparatus includes a chuck table for holding a workpiece such as a wafer thereon, a laser beam applying unit for applying a laser beam having a wavelength absorbable by the workpiece to the workpiece held on the chuck table, and a feed mechanism for processing-feeding the chuck table and the laser beam applying unit relative to each other. The laser processing apparatus can divide the workpiece highly accurately into individual device chips by applying the laser beam to the workpiece.

The laser processing apparatus is problematic in that melted debris produced from the workpiece when the laser beam is applied to the workpiece tends to be deposited on devices on a face side of the workpiece, degrading the quality of the device chips fabricated from the workpiece. Moreover, if the workpiece is in the form of a wafer including copper interconnects laminated on a silicon substrate, then the applied laser beam melts and mixes copper and silicon into debris, and the debris is likely to be deposited on the devices, degrading the quality of the device chips. Debris of this type is apt to occur on workpieces including a semiconductor material and a metal material, and may be called growing debris because it grows over time after the laser beam has been applied to the workpiece.

The applicant has developed a technology in which a laser beam is applied again to a workpiece in order to remove melted debris and growing debris produced around device chips on the workpiece (see, for example, Japanese Patent Laid-open No. 2015-133437).

SUMMARY OF THE INVENTION

According to the technology disclosed in Japanese Patent Laid-open No. 2015-133437, however, productivity remains to be improved because it is necessary to apply a laser beam to a workpiece for removing melted debris and growing debris therefrom after a laser beam has been applied to the workpiece for forming grooves in the workpiece.

It is therefore an object of the present invention to provide a laser processing apparatus and a laser processing method that are capable of simultaneously applying a laser beam to a workpiece for forming grooves in the workpiece and applying a laser beam to the workpiece for breaking growing debris and restraining melted debris from occurring.

In accordance with an aspect of the present invention, there is provided a laser processing apparatus including a chuck table for holding a workpiece thereon, a laser beam applying unit for applying pulsed laser beams to the workpiece held on the chuck table, and a feed mechanism for processing-feeding the chuck table and the laser beam applying unit relative to each other. Further, in the laser processing apparatus, the laser beam applying unit includes a laser oscillating mechanism for emitting the pulsed laser beams and a beam condenser for converging the pulsed laser beams emitted from the laser oscillating mechanism and applying the converged pulsed laser beams to the workpiece held on the chuck table. Furthermore, the laser oscillating mechanism includes a group setting section for establishing the number of the pulsed laser beams to be applied to the workpiece until a time after which melted debris produced by the pulsed laser beams applied to the workpiece is solidified, and assigns the pulsed laser beams to a group, under conditions that, within a period of time which is shorter than a period of time in which melted debris is produced from the workpiece by a pulsed laser beam applied to the workpiece, and within a period of time after which a plasma generated from the workpiece by the pulsed laser beam applied thereto becomes extinct, a next pulsed laser beam is applied to the workpiece to sustain the plasma uninterruptedly to break growing debris, and a time interval setting section for establishing a time interval between the group and another group adjacent thereto as representing a period of time taken for heat generated by the application of the pulsed laser beams of the group to be dissipated, and also establishing time intervals between the pulsed laser beams of the group, the laser oscillating mechanism setting a repetitive frequency for each group of the pulsed laser beams as one unit.

Preferably, the laser oscillating mechanism includes a plurality of laser diodes for emitting the pulsed laser beams, the group setting section establishes the group of the pulsed laser beams to be emitted from the laser diodes, and the time interval setting section controls a pulse delay generator to input signals to the laser diodes at desired time intervals, and also controls the pulse delay generator to input signals to the laser diodes to set the period of time taken for the heat generated in the workpiece by the application of the pulsed laser beams of the group thereto to be dissipated, as the time interval between the group and the other group adjacent thereto.

Preferably, the laser oscillating mechanism includes a plurality of laser oscillators for emitting the pulsed laser beams, the group setting section establishes the group of the pulsed laser beams to be emitted from the laser oscillators, and the time interval setting section controls a delayed voltage generator to apply delayed voltages to the laser oscillators to cause the laser oscillators to emit the pulsed laser beams at desired time intervals, and also controls the delayed voltage generator to set the period of time taken for the heat generated in the workpiece by the application of the pulsed laser beams of the group thereto to be dissipated, as the time interval between the group and the other group adjacent thereto.

Preferably, the laser oscillating mechanism sets the repetitive frequency by decimating a predetermined number of groups from among the groups of the pulsed laser beams emitted in a second.

In accordance with another aspect of the present invention, there is provided a laser processing method of processing a workpiece using a laser processing apparatus having a laser oscillating mechanism that includes a group setting section for establishing a group of pulsed laser beams and a time interval setting section for establishing time intervals between the pulsed laser beams of the group, the laser oscillating mechanism setting a repetitive frequency for each group of the pulsed laser beams as one unit, the laser processing method including a groove forming step of forming grooves in the workpiece by way of ablation by applying the pulsed laser beams to the workpiece, and a debris breaking and restraining step of breaking growing debris produced in the groove forming step and restraining melted debris from being produced in the groove forming step, in which in order to simultaneously carry out the debris breaking and restraining step when the groove forming step is carried out, the group setting section establishes the number of the pulsed laser beams of the group to be applied to the workpiece until a time after which the melted debris produced by the pulsed laser beams applied to the workpiece is solidified, under conditions that, within a period of time which is shorter than a period of time in which the melted debris is produced from the workpiece by a pulsed laser beam applied to the workpiece, and within a period of time after which a plasma generated from the workpiece by the pulsed laser beam applied thereto becomes extinct, a next pulsed laser beam is applied to the workpiece to sustain the plasma uninterruptedly to break the growing debris, and the interval setting section establishes a time interval between the group and another group adjacent thereto as representing a period of time taken for heat generated by the application of the pulsed laser beams of the group to be dissipated, and also establishing time intervals between the pulsed laser beams of the group.

Preferably, providing that the melted debris is produced after a period of time t1 and solidified after a period of time t2 after the pulsed laser beam has been applied to the workpiece, the time interval setting section establishes time intervals t3 between the pulsed laser beams of the group so as to satisfy t3<t1 and also to satisfy t4<t3<t5 where t4 represents a period of time taken for the plasma to be generated from the workpiece and t5 represents a period of time taken for the plasma to become extinct, and the group setting section establishes the number n of the pulsed laser beams of the group as an integral part of n=(t2/t3)+1.

According to the present invention, since the application of pulsed laser beams to a workpiece for forming grooves therein and the application of pulsed laser beams to the workpiece for breaking growing debris and restraining melted debris from being produced can simultaneously be performed, the productivity regarding the fabrication of devices from the workpiece is increased.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

A laser processing apparatus and a laser processing method according to a preferred embodiment of the present invention will hereinafter be described with reference to the drawings.

Figure 1:
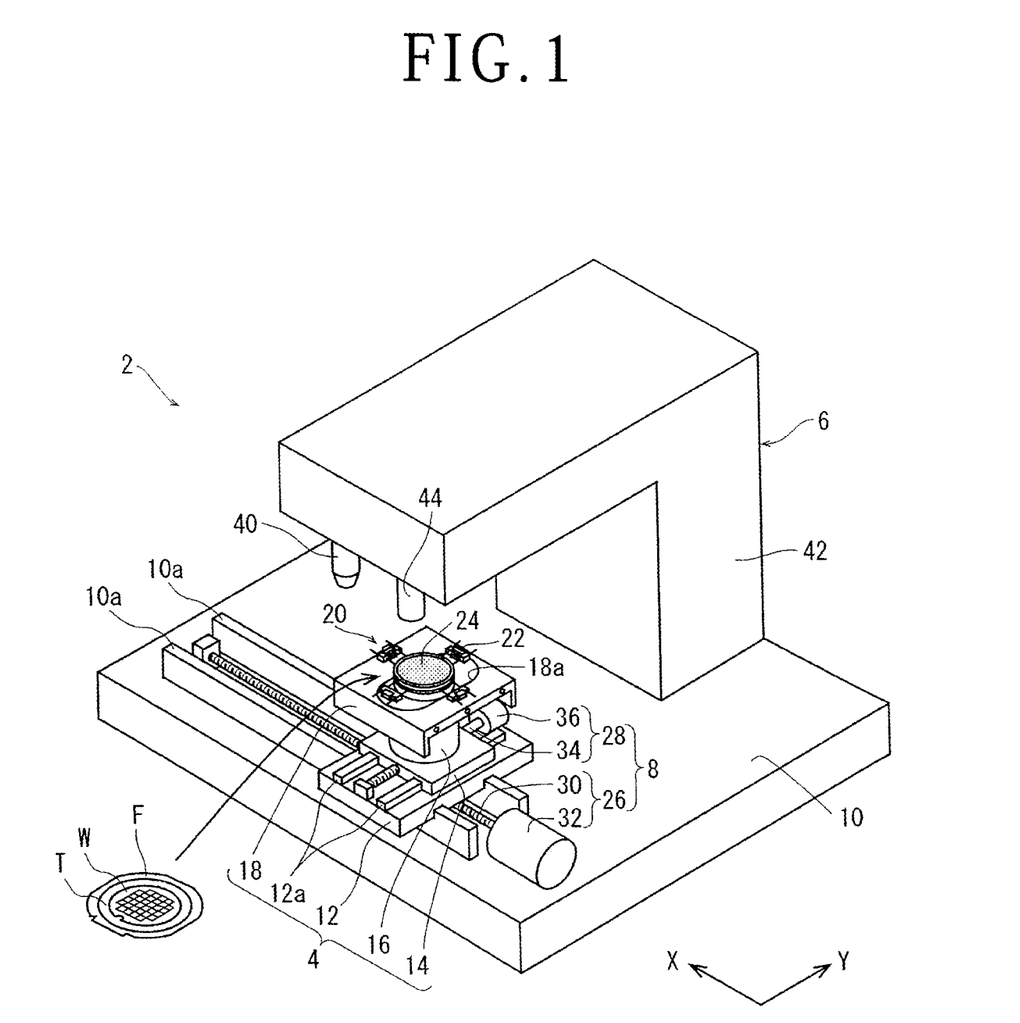
FIG. 1 is a perspective view of a laser processing apparatus according to an embodiment of the present invention.

First, the laser processing apparatus according to an embodiment of the present invention will be described below. As illustrated in FIG. 1, the laser processing apparatus, denoted in its entirety by 2, includes a holding unit 4 for holding a workpiece such as a wafer or the like thereon, a laser beam applying unit 6 for applying a laser beam to the workpiece held on the holding unit 4, and a feed mechanism assembly 8 for processing-feeding the holding unit 4 and the laser beam applying unit 6 relative to each other.

As illustrated in FIG. 1, the holding unit 4 includes an X-axis movable plate 12 movably supported on a base 10 for movement along an X-axis, a Y-axis movable plate 14 movably supported on the X-axis movable plate 12 for movement along a Y-axis, a post 16 fixedly mounted on the Y-axis movable plate 14, and a cover plate 18 mounted on an upper end of the post 16. The cover plate 18 has an oblong hole 18a defined therein that extends along the Y-axis. The holding unit 14 also includes a circular chuck table 20 rotatably mounted on the upper end of the post 16 and extending upwardly through the oblong hole 18a. A plurality of clamps 22 are disposed on an outer circumferential edge of the chuck table 20 at circumferentially spaced intervals.

A circular porous suction chuck 24 that is fluidly connected to suction means, not illustrated, is disposed on an upper surface of the chuck table 20. When actuated, the suction means generates and transmits suction forces to the suction chuck 24, causing the suction chuck 24 to hold the workpiece under suction on its upper surface. The chuck table 20 is rotatable about its vertical central axis by an electric motor, not illustrated, housed in the post 16.

In FIG. 1, the X-axis extends horizontally and is represented by the arrow X, and the Y-axis extends horizontally and is represented by the arrow Y. The X-axis and the Y-axis are perpendicular to each other, and jointly define an XY plane that lies essentially horizontally.

The feed mechanism assembly 8 according to the present embodiment includes an X-axis feed mechanism 26 for processing-feeding the chuck table 20 along the X-axis and a Y-axis feed mechanism 28 for indexing-feeding the chuck table 20 along the Y-axis.

The X-axis feed mechanism 26 has a ball screw 30 operatively coupled to the X-axis movable plate 12 and extending along the X-axis, and an electric motor 32 for rotating the ball screw 30 about its central axis. The X-axis feed mechanism 26 operates as follows: When the electric motor 32 is energized, it rotates the ball screw 30 about its central axis. The rotation motion of the ball screw 30 is converted into linear motion to be transmitted to the X-axis movable plate 12, moving the X-axis movable plate 12 along the X-axis along guide rails 10a mounted on an upper surface of the base 10. In this manner, the chuck table 20 is processing-fed along the X-axis.

The Y-axis feed mechanism 28 has a ball screw 34 operatively coupled to the Y-axis movable plate 14 and extending along the Y-axis, and an electric motor 36 for rotating the ball screw 34 about its central axis. The Y-axis feed mechanism 28 operates as follows: When the electric motor 36 is energized, it rotates the ball screw 34 about its central axis. The rotation motion of the ball screw 34 is converted into linear motion to be transmitted to the Y-axis movable plate 14, moving the Y-axis movable plate 14 along the Y-axis along guide rails 12a mounted on the X-axis movable plate 12. In this manner, the chuck table 20 is indexing-fed along the Y-axis.

Figure 2:
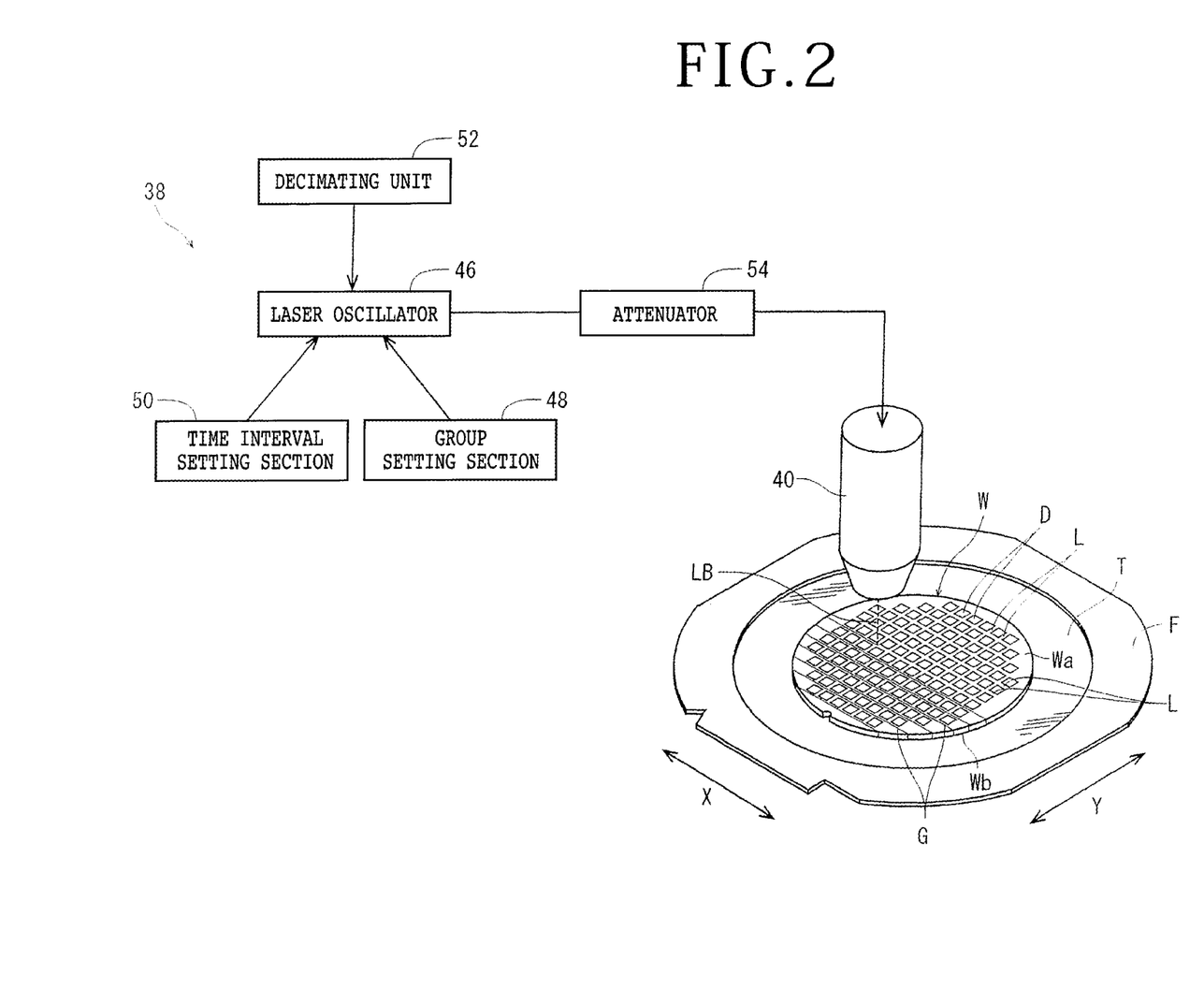
FIG. 2 is a block diagram, partly in perspective, of the laser processing apparatus illustrated in FIG. 1.

As illustrated in FIGS. 1 and 2, the laser beam applying unit 6 includes a laser oscillating mechanism 38 (see FIG. 2) for emitting a pulsed laser beam and a beam condenser 40 for converging the pulsed laser beam emitted from the laser oscillating mechanism 38 and applying the converged pulsed laser beam to the workpiece held on the holding unit 4.

As illustrated in FIG. 1, the laser beam applying unit 6 has a housing 42 extending upwardly from the upper surface of the base 10 and including an upper arm extending substantially horizontally in overhanging relation to the holding unit 4. The laser oscillating mechanism 38 is housed in the upper arm of the housing 42. The beam condenser 40 is mounted on a lower surface of the distal end of the upper arm of the housing 42. An image capturing unit 44 for capturing an image of the workpiece held on the holding unit 4 is also mounted on the lower surface of the distal end of the upper arm of the housing 42 adjacent to the beam condenser 40.

As illustrated in FIG. 2, the laser oscillating mechanism 38 includes a laser oscillator 46 for emitting a pulsed laser beam having a wavelength absorbable by the workpiece, a group setting section 48, a time interval setting section 50, and an attenuator 54 for adjusting the output power of the pulsed laser beam emitted from the laser oscillator 46. The laser oscillating mechanism 38 can set a repetitive frequency for each group of the pulsed laser beams as one unit, as described later.

Figure 3:
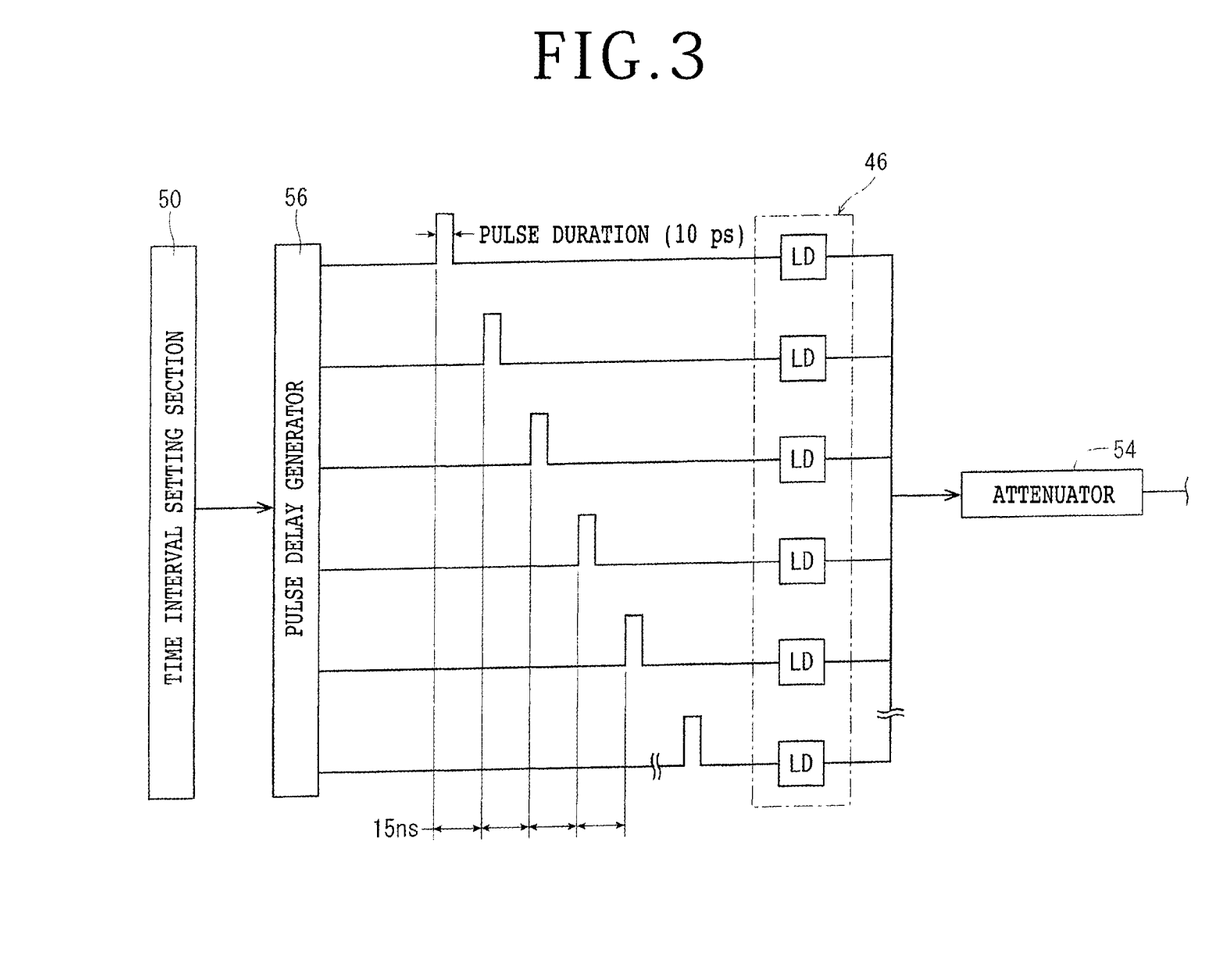
FIG. 3 is a schematic diagram of an example of a laser oscillating mechanism illustrated in FIG. 2.
Figure 4:
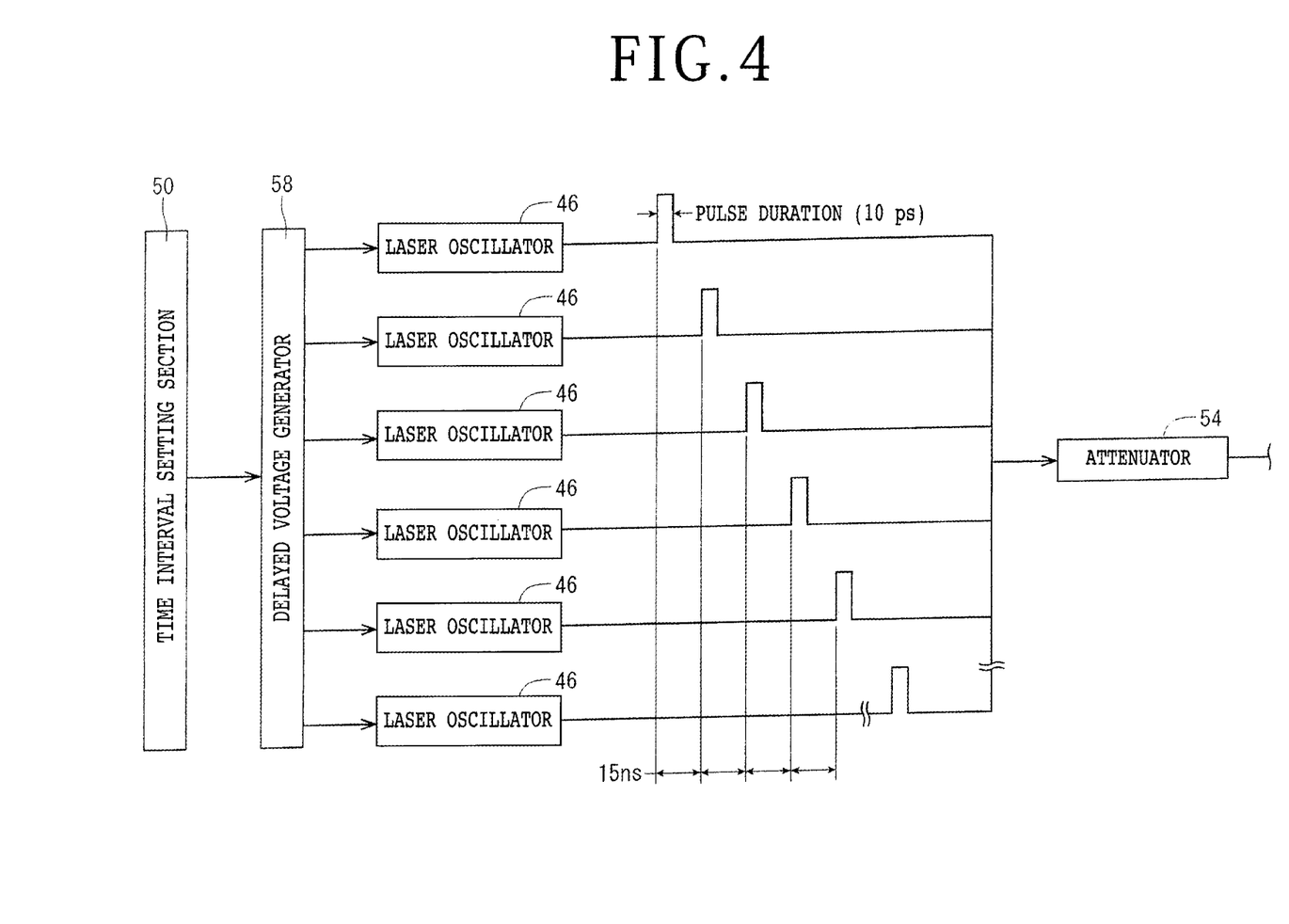
FIG. 4 is a schematic diagram of another example of the laser oscillating mechanism illustrated in FIG. 2.

FIG. 2 illustrates one block representing the laser oscillator 46. However, the laser oscillating mechanism 38 may include one or more laser oscillators 46. If the laser oscillating mechanism 38 includes one laser oscillator 46, then the laser oscillator 46 may include a plurality of laser diodes LD, as illustrated in FIG. 3. Alternatively, the laser oscillating mechanism 38 may include a plurality of laser oscillators 46, as illustrated in FIG. 4. The laser medium is not limited to a semiconductor, but may be another known medium such as a gas.

The group setting section 48 establishes the number of pulsed laser beams to be applied to the workpiece until the time after which the melted debris produced from the workpiece by the applied pulsed laser beams is solidified, and assigns those pulsed laser beams to a group, under the conditions that, within the period of time which is shorter than the period of time in which melted debris is produced from the workpiece by a pulsed laser beam applied to the workpiece, and within the period of time after which a plasma generated from the workpiece by the pulsed laser beam applied thereto becomes extinct, a next pulsed laser beam is applied to the workpiece to sustain the plasma uninterruptedly to break growing debris.

The applicant has confirmed that melted debris produced from a workpiece when a pulsed laser beam is applied thereto occurs after elapse of approximately 100 ns from the application of the pulsed laser beam to the workpiece, and is solidified after elapse of approximately 500 ns from the application of the pulsed laser beam to the workpiece. Therefore, the "period of time which is shorter than the period of time in which melted debris is produced from the workpiece by a pulsed laser beam applied to the workpiece," referred to above is a period of time shorter than 100 ns from the application of the pulsed laser beam, for example.

Furthermore, generally, a plasma generated when a pulsed laser beam is applied to a workpiece occurs after elapse of approximately 10 ns from the application of the pulsed laser beam to the workpiece and becomes extinct after elapse of approximately 30 ns from the application of the pulsed laser beam to the workpiece. Therefore, "within the period of time after which a plasma generated from the workpiece by the pulsed laser beam applied thereto becomes extinct" referred to above is, for example, a period of time before elapse of approximately 30 ns from the application of the pulsed laser beam to the workpiece.

It follows from the foregoing that "within the period of time which is shorter than the period of time in which melted debris is produced from the workpiece by a pulsed laser beam applied to the workpiece, and within the period of time after which a plasma generated from the workpiece by the pulsed laser beam applied thereto becomes extinct" referred to above is a period of time shorter than 100 ns from the application of the pulsed laser beam and until approximately 30 ns elapses from the application of the pulsed laser beam.

Figure 5:
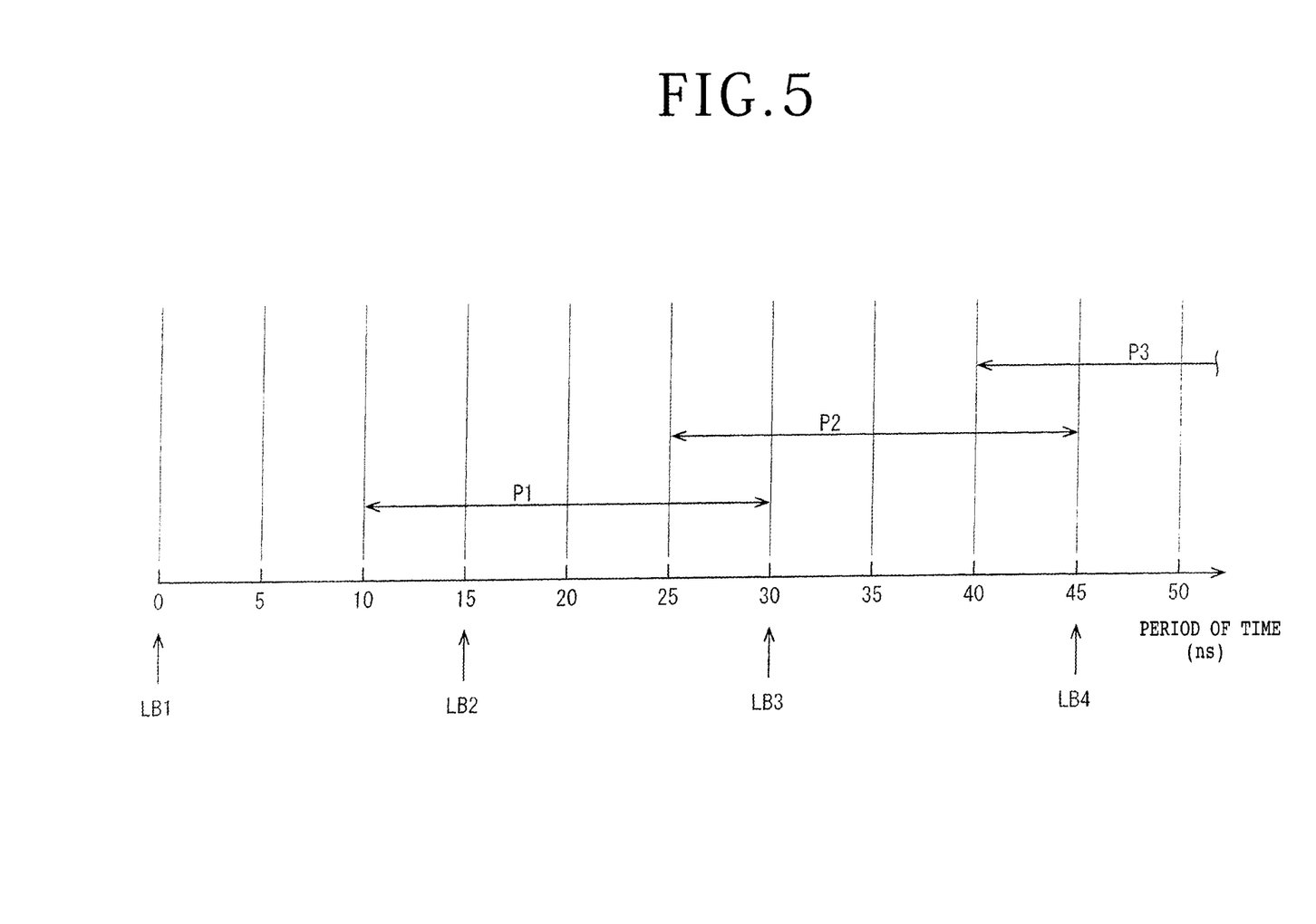
FIG. 5 is a schematic diagram illustrating periods of time taken for plasmas to be generated by the application of a pulsed laser beam and periods of time taken for plasmas to become extinct.

Next, a process of sustaining a plasma uninterruptedly will be described below with reference to FIG. 5. According to the exampled described above, using the time at which a first pulsed laser beam LB1, i.e., a first pulse, is applied to the workpiece as a reference (0 s), a plasma P1 due to the first pulse is generated 10 ns after the first pulsed laser beam LB1, and becomes extinct 30 ns after the first pulsed laser beam LB1.

Providing that a second pulsed laser beam LB2, i.e., a second pulse, is applied to the workpiece after elapse of 15 ns before elapse of the period of time of 30 ns before the plasma P1 due to the first pulse becomes extinct, a plasma P2 due to the second pulse is generated 25 ns after the first pulse and becomes extinct 45 ns after the first pulse. In other words, the plasma P2 is generated before the plasma P1 becomes extinct. Similarly, providing that a third pulsed laser beam LB3, i.e., a third pulse, is applied 15 ns after the second pulse, a plasma P3 due to the third pulse is generated before the plasma P2 becomes extinct.

By thus applying, within the period of time which is shorter than the period of time in which melted debris is produced from the workpiece by a pulsed laser beam applied thereto, and within the period of time after which a plasma generated from the workpiece by the pulsed laser beam applied thereto becomes extinct, a next pulsed laser beam to the workpiece, i.e., by applying the pulsed laser beams at time intervals of 15 ns in the above example, the plasma generated from the workpiece can be sustained uninterruptedly. In this manner, growing debris produced from the workpiece by the pulsed laser beams applied thereto can be broken by the plasma.

Note that "within the period of time which is shorter than the period of time in which melted debris is produced from the workpiece by a pulsed laser beam applied to the workpiece, and within the period of time after which a plasma generated from the workpiece by the pulsed laser beam applied thereto becomes extinct" referred to above is not limited to 15 ns after each of the pulsed laser beams has been applied.

As described above, melted debris is solidified after elapse of approximately 500 ns from the application of a pulsed laser beam to the workpiece. Therefore, the group setting section 48 according to the present embodiment establishes the number of pulsed laser beams to be applied to the workpiece before 500 ns elapses after the first pulsed laser beam, i.e., the first pulse, has been applied to the workpiece, and assigns those pulsed laser beams to a group, under the condition that the plasma generated by the application of the pulsed laser beams to the workpiece is sustained uninterruptedly to break growing debris. For example, if the time intervals between the pulses are 15 ns, as described in the example above, then the number of pulsed laser beams of a group is set to 34, i.e., 34 pulses.

In the example illustrated in FIG. 3, the group setting section 48 that has the above function establishes a group of the pulsed laser beams emitted by a plurality of, e.g., 34, laser diodes LD. For example, the group setting section 48 may establish a group of the pulsed laser beams emitted from some, e.g., 34, of all laser diodes, e.g., 40 laser diodes, included in the laser oscillator 46.

In the other example illustrated in FIG. 4, the group setting section 48 establishes a group of the pulsed laser beams emitted by a plurality of laser oscillators 46. For example, the group setting section 48 may establish a group of the pulsed laser beams emitted from some of the laser oscillators 46 included in the laser oscillating mechanism 38.

By thus establishing the number of pulsed laser beams of a group, when the pulsed laser beams are applied to the workpiece, the plasma generated by the applied pulsed laser beams can break growing debris produced by the application of the pulsed laser beams and restrain melted debris from being produced.

In the present description, of debris produced from the workpiece by the application of the pulsed laser beams to the workpiece, the debris that grows over time, i.e., that becomes progressively large after being produced, is referred to as growing debris, and the debris that does not grow over time is referred to as melted debris.

The time interval setting section 50 establishes a time interval between a group and another group adjacent thereto as representing the period of time taken for the heat generated by the application of the pulsed laser beams of a group to be dissipated, and also establishes time intervals between the pulsed laser beams of a group.

Figure 6:
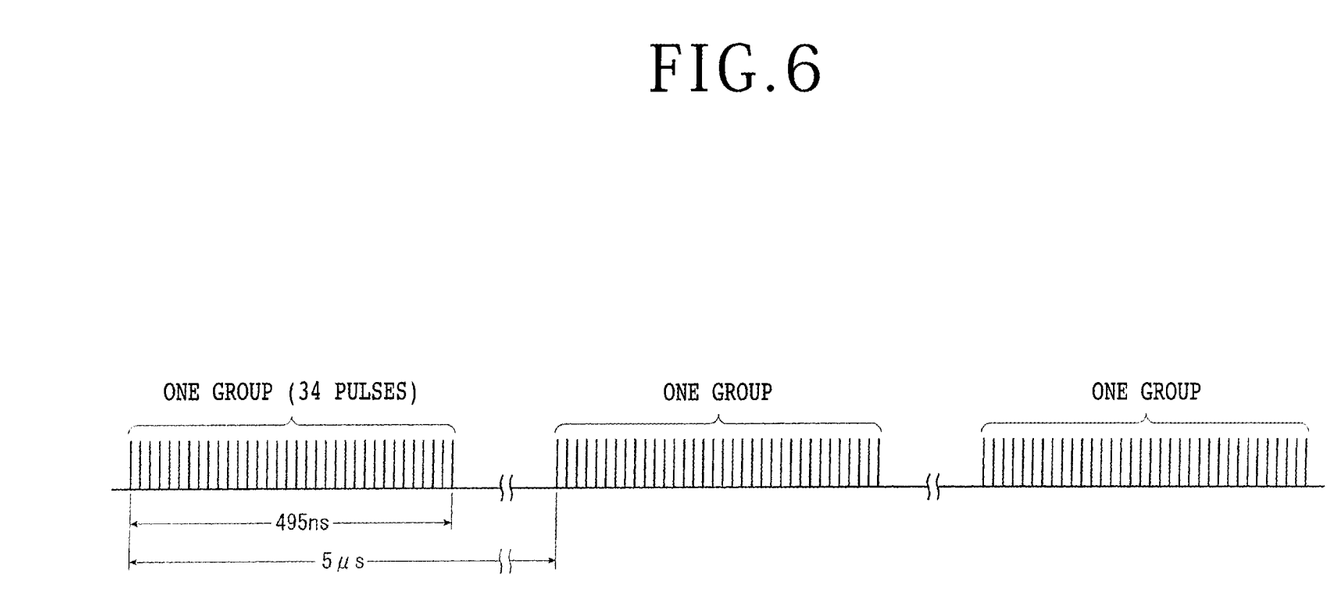
FIG. 6 is a schematic diagram of a pulsed laser beam applied to a workpiece.

It is known in the art that, when approximately 5 µs elapses after a pulsed laser beam has been applied to a workpiece made of a semiconductor material such as silicon, the heat generated in the workpiece by the applied pulsed laser beam is dissipated and the temperature of the workpiece drops to substantially the same level as before the pulsed laser beam is applied to the workpiece. Therefore, as illustrated in FIG. 6, the time interval setting section 50 sets the time interval between a group and another group adjacent thereto to 5 µs or longer.

Since the heat generated in the workpiece is dissipated after the pulsed laser beams of a group have been applied to the workpiece until the pulsed laser beams of a next group are applied to the workpiece, the devices on the workpiece are prevented from being lowered in quality by the heat.

The time interval setting section 50 also establishes time intervals, i.e., pulse intervals, between the pulsed laser beams of a group. In the example illustrated in FIG. 3, the time interval setting section 50 controls a pulse delay generator 56 to input signals to the laser diodes LD at desired time intervals, i.e., 15 ns in the illustrated example, and also controls the pulse delay generator 56 to input signals to the laser diodes LD to set the period of time taken for the heat generated in the workpiece by the application of the pulsed laser beams of a group thereto to be dissipated, as the time interval, i.e., 5 µs in the above example, between a group and another group adjacent thereto. The signals input from the pulse delay generator 56 to the laser diodes LD have a pulse duration that is set to a desired value, e.g., 10 ps.

In the example illustrated in FIG. 4, the time interval setting section 50 controls a delayed voltage generator 58 to apply delayed voltages to the laser oscillators 46 to cause the laser oscillators 46 to emit the pulsed laser beams at desired time intervals, i.e., 15 ns in the illustrated example, and also controls the delayed voltage generator 58 to set the period of time taken for the heat generated in the workpiece by the application of the pulsed laser beams of a group thereto to be dissipated, as the time interval, i.e., 5 µs in the above example, between a group and another group adjacent thereto. The pulsed laser beams emitted from the laser oscillators 46 in response to the delayed voltages applied from the delayed voltage generator 58 to the laser oscillators 46 have a pulse duration that is set to a desired value, e.g., 10 ps.

When the pulse delay generator 56 inputs signals to the laser diodes LD as illustrated in FIG. 3 or when the delayed voltage generator 58 applies delayed voltages to the laser oscillators 46 as illustrated in FIG. 4, the laser diodes LD or the laser oscillators 46 emit the pulsed laser beams, e.g., 34 pulses, of successive groups at time intervals, i.e., 5 µs, as illustrated in FIG. 6. The repetitive frequency of the pulsed laser beams is established in terms of groups of 34 pulses. Providing that the time intervals between the groups of the pulsed laser beams are 5 µs as illustrated, the repetitive frequency is 200 kHz.

The pulsed laser beams of the groups at the predetermined time intervals are supplied from the laser diodes LD or the laser oscillators 46 to the attenuator 54. After the output power of the pulsed laser beams has been adjusted by the attenuator 54, the pulsed laser beams are converged by the beam condenser 40 and then applied to the workpiece. Light guide means such as an optical fiber is interposed between the laser diodes LD or the laser oscillators 46 and the attenuator 54, for guiding the pulsed laser beams of the successive groups from the laser diodes LD or the laser oscillators 46 to the attenuator 54.

According to the present embodiment, the time intervals, i.e., 5 µs in the illustrated example, between the groups of the pulsed laser beams are established by the time interval setting section 50 as described above. However, the intervals between the groups of the pulsed laser beams may be established by a decimating unit 52 (see FIG. 2) that decimates a certain number of groups from among the groups of the pulsed laser beams emitted in a second from the laser oscillator 46. The decimating unit 52 may include an acousto-optical device or an electro-optical device.

Specifically, the pulsed laser beams are emitted in successive groups from either the laser diodes LD in the example illustrated in FIG. 3 or the laser oscillators 46 in the example illustrated in FIG. 4. In either the example illustrated in FIG. 3 or the example illustrated in FIG. 4, the decimating unit 52 decimates a certain number of groups from among the groups of the laser diodes LD or of the pulsed laser beams emitted in a second from the laser oscillators 46, so that the laser oscillating mechanism 38 generates the pulsed laser beams of successive groups at certain time intervals.

FIG. 2 also illustrates in perspective a wafer W as the workpiece to be processed by the laser processing apparatus 2. The wafer W is shaped as a circular plate and made of a suitable semiconductor material such as silicon. The wafer W has a face side Wa including a plurality of rectangular areas demarcated by a grid of projected dicing lines L, with devices D such as ICs or LSI circuits constructed in the respective rectangular areas. The face side Wa of the wafer W is coated with a metal film of copper or the like, not illustrated.

According to the present embodiment, the wafer W has a reverse side Wb, which is opposite the face side Wa, affixed to an adhesive tape T that is fixed to an annular frame F. Alternatively, the face side Wa of the wafer W may be affixed to the adhesive tape T.

Now, a laser processing method according to the present embodiment will be described below. According to the present embodiment, a preparing step is carried out to prepare a laser processing apparatus, e.g., the laser processing apparatus 2 described above, for applying a pulsed laser beam having a wavelength absorbable by the wafer W.

After the preparing step has been carried out, a groove forming step is carried out to form grooves in the wafer by way of ablation by applying the pulsed laser beam to the wafer W.

In the groove forming step, the wafer W is held under suction on the upper surface of the chuck table 20 while the face side Wa of the wafer W is facing upwardly. The annular frame F is gripped in position by the clamps 22. The image capturing unit 44 then captures an image of the face side Wa of the wafer W on the chuck table 20, and those projected dicing lines L that extend in a first direction are oriented parallel to the X-axis on the basis of the captured image of the face side Wa of the wafer W. The pulsed laser beam is aimed at one of the projected dicing lines L extending in the first direction, and the focused spot of the pulsed laser beam is vertically aligned with the face side Wa of the wafer W.

Then, while the chuck table 20 is being processing-fed along the X-axis, the pulsed laser beam, which is denoted by LB in FIG. 2 and whose wavelength is absorbable by the wafer W, is applied from the beam condenser 40 to the wafer W, ablating the wafer W along the one of the projected dicing lines L at which the pulsed laser beam LB has been aimed. A groove G (see FIG. 2) is now formed in the wafer W along the projected dicing line L.

Thereafter, the chuck table 20 is indexing-fed with respect to the beam condenser 40 by a distance corresponding to the interval along the Y-axis between adjacent ones of the projected dicing lines L. The pulsed laser beam LB is then aimed at a next one of the projected dicing lines L and applied to the wafer W along the one of the projected dicing lines L while the chuck table 20 is being processing-fed along the X-axis, forming a next groove G in the wafer W along the projected dicing line L. Then, the chuck table 20 is indexing-fed with respect to the beam condenser 40. The above cycle of operation of the laser processing apparatus 2 is repeated until grooves G are formed in the wafer W along all the projected dicing lines L that extend in the first direction parallel to the X-axis.

Then, the chuck table 20 is turned 90 degrees about its central axis. Thereafter, the above cycle of operation of the laser processing apparatus 2 is repeated again until grooves G are formed in the wafer W along all the projected dicing lines L that extend in a second direction perpendicular to the first direction, i.e., the projected dicing lines L along which the grooves G have previously been formed in the wafer W. By thus carrying out the groove forming step, the grooves G have now been formed in a grid pattern in the wafer W along the grid of projected dicing lines L, thereby dividing the wafer W into individual device chips.

Debris Breaking and Restraining Step

While the groove forming step is being carried out, a debris breaking and restraining step is simultaneously carried out to break growing debris produced in the groove forming step and also to restrain melted debris from being produced in the groove forming step.

In the breaking and restraining step, the group setting section 48 establishes the number of pulsed laser beams of a group to be applied to the workpiece until the time after which the melted debris produced from the workpiece is solidified, under the conditions that, within the period of time which is shorter than the period of time in which melted debris is produced from the workpiece by a pulsed laser beam applied to the workpiece, and within the period of time after which a plasma generated from the workpiece by the pulsed laser beam applied thereto becomes extinct, a next pulsed laser beam is applied to the workpiece to sustain the plasma uninterruptedly to break growing debris, and the time interval setting section 50 establishes a time interval between a group and another group adjacent thereto as representing the period of time for the heat generated by the application of the pulsed laser beams of a group to be dissipated, and also establishes time intervals between the pulsed laser beams of a group.

Pulse Intervals and the Number of Pulses

Time intervals, i.e., pulse intervals, between the pulsed laser beams of a group and the number of pulsed laser beams, i.e., the number of pulses, of a group will be described below. Providing that melted debris is produced after a period of time $t1$ and solidified after a period of time $t2$ after a pulsed laser beam has been applied to the workpiece, the time interval setting section 50 establishes time intervals, i.e., pulse intervals, $t3$ between the pulsed laser beams of a group so as to satisfy $t3<t1$ and also to satisfy $t4<t3<t5$ where $t4$ represents the period of time taken for a plasma to be generated from the workpiece and $t5$ represents the period of time taken for the plasma to become extinct, and the group setting section 48 establishes the number n of the pulsed laser beams, i.e., the number n of pulses, of a group as an integral part of $n=(t2/t3)+1$.

As described above, it has been confirmed that melted debris produced from a workpiece when a pulsed laser beam is applied thereto occurs after elapse of approximately 100 ns from the application of the pulsed laser beam to the workpiece, and is solidified after elapse of approximately 500 ns from the application of the pulsed laser beam to the workpiece. Generally, a plasma generated when a pulsed laser beam is applied to a workpiece occurs after elapse of approximately 10 ns from the application of the pulsed laser beam to the workpiece and becomes extinct after elapse of approximately 30 ns from the application of the pulsed laser beam to the workpiece.

Consequently, using the time at which a first pulsed laser beam LB1, i.e., a first pulse, is applied to the workpiece as a reference (0 s), Period of time $t1$ taken for melted debris to be produced=100 ns, Period of time $t2$ taken for the melted debris to be solidified=500 ns, Period of time $t4$ taken for a plasma to be generated=10 ns, and Period of time $t5$ taken for the plasma to become extinct=30 ns.

In this case, the time interval setting section 50 establishes time intervals, i.e., pulse intervals, $t3$ between the pulsed laser beams of a group as 15 ns, for example. Since $t3=15$ ns, both $t3<t1$ (100 ns) and $t4$ (10 ns)$<t3<t5$ (30 ns) are satisfied.

Inasmuch as the time interval setting section 50 establishes time intervals t3 as 15 ns, the group setting section 48 establishes the number n of the pulsed laser beams, i.e., the number of pulses, of a group as:

$$\begin{aligned} n &= \text{an integral part of } (t2/t3) + 1 \\ &= \text{an integral part of } (500 \text{ ns}/15 \text{ ns}) + 1 \\ &= \text{an integral part of } (33.333\cdots) + 1 \\ &= 33 + 1 \\ &= 34. \end{aligned}$$

In this manner, the group setting section 48 establishes the number (n=34) of the pulsed laser beams of a group to be applied to the workpiece until before elapse of the period of time (t2=500 ns) taken for the melted debris produced from the workpiece to be solidified after a first pulsed laser beam, i.e., a first pulse, has been applied, under the conditions that, within the period of time (t5=30 ns) which is shorter than the period of time (t1=100 ns) in which melted debris is produced from the workpiece by a pulsed laser beam applied to the workpiece, and within the period of time after which a plasma generated from the workpiece by the pulsed laser beam applied thereto becomes extinct, a next pulsed laser beam is applied to the workpiece to sustain the plasma uninterruptedly to break growing debris. Thus, when the pulsed laser beams are applied to the workpiece, growing debris produced by the application of the pulsed laser beams is broken by the plasma, and melted debris is restrained from being produced.

(Time Intervals Between Groups)

As described above, the time interval setting section 50 establishes not only the time intervals, i.e., 15 ns in the above example, between the pulsed laser beams of a group, but also the period of time taken for the heat generated in the workpiece by the application of the pulsed laser beams of a group thereto to be dissipated, as the time interval between a group and another group adjacent thereto. This is because if the pulsed laser beams are continuously applied to the wafer W, heat is accumulated in the wafer W, tending to adversely affect the devices on the wafer W, i.e., lower the quality of the devices.

As described above, it is known in the art that, when approximately 5 μs elapses after a pulsed laser beam has been applied to a workpiece made of a semiconductor material such as silicon, the heat generated in the workpiece by the applied pulsed laser beam is dissipated and the temperature of the workpiece drops to substantially the same level as before the pulsed laser beam is applied to the workpiece. Therefore, as illustrated in FIG. 6, the time interval setting section 50 sets the time interval between a group and another group adjacent thereto to 5 μs or longer.

Since the heat generated in the wafer W is thus dissipated after the pulsed laser beams of a group have been applied to the wafer W until the pulsed laser beams of a next group are applied to the wafer W, the devices on the wafer W are prevented from being adversely affected by the heat.

The grout setting section 48 should preferably establish the number of pulsed laser beams of a group such that the temperature due to the heat generated by the pulsed laser beams of a group will be equal to or lower than the temperature at which the devices are not adversely affected.

After the group setting section 48 has established the number (n=34) of the pulsed laser beams of a group and the time interval setting section 50 has established a time interval (5 μs) between groups and time intervals (t3=15 ns) between the pulsed laser beams of a group, the time interval setting section 50 controls the pulse delay generator 56 to input signals to the laser diodes LD at the time intervals of 15 ns, and also controls the pulse delay generator 56 to input signals to the laser diodes LD to set the time intervals between groups to 5 μs in the example illustrated in FIG. 3.

Alternatively, the time interval setting section 50 controls the delayed voltage generator 58 to apply delayed voltages to the laser oscillators 46 to cause the laser oscillators 46 to emit the pulsed laser beams at the time intervals of 15 ns, and also controls the delayed voltage generator 58 to apply delayed voltages to the laser oscillators 46 to set the time intervals between groups to 5 μs in the example illustrated in FIG. 4.

The decimating unit 52 illustrated in FIG. 2 may set the time intervals between groups to 5 μs by decimating a certain number of groups from among the groups of the pulsed laser beams emitted in a second.

Specifically, while the time interval setting section 50 is controlling the pulse delay generator 56 to input signals to the laser diodes LD at the time intervals of 15 ns or controlling the delayed voltage generator 58 to apply delayed voltages to the laser oscillators 46 to cause the laser oscillators 46 to emit the pulsed laser beams at the time intervals of 15 ns, the decimating unit 52 may decimate a certain number of groups from among the groups of the pulsed laser beams emitted in a second, thereby setting the time intervals between groups to 5 μs. Providing that the time intervals between the groups of the pulsed laser beams are 5 μs, the repetitive frequency is 200 kHz, as described above.

By thus simultaneously carrying out the groove forming step and the debris breaking and restraining step, there are generated the pulsed laser beams where the number n of pulses of a group n=34, the pulse intervals t3=15 ns, and the time interval between groups=5 μs. The pulsed laser beams, after their output power has been adjusted by the attenuator 54, are converged by the beam condenser 40 and then applied to the wafer W along the projected dicing lines L. Therefore, grooves G are formed in the wafer W along the projected dicing lines L while growing debris produced by the application of the pulsed laser beams is being broken and melted debris is being restrained from being produced.

The groove forming step and the debris breaking and restraining step may be carried out under the following processing conditions:

Wavelength of pulsed laser beams: 355 nm
Average output power: 60 W
Repetitive frequency of a group: 200 kHz
Makeup of a group: 34 pulsed laser beams
Power density of a group: 60 J/cm$^2$
Pulse duration of a group: 495 ns=t3×(34−1)=15 ns×33
Spot size of a group: 10 μm along X-axis and 50 μm along Y-axis
Overlapping ratio between groups: 50%
Feed speed: 1 m/s
Period of time t1 taken for melted debris to be produced: Produced after elapse of 100 ns after a laser beam has been applied
Period of time t2 taken for melted debris to be solidified: Solidified after elapse of 500 ns after a laser beam has been applied
Time intervals t3 between pulses: 15 ns (see FIGS. 3 and 4)

Period of time t4 taken for a plasma to be generated:
Generated after elapse of approximately 10 ns after a laser beam has been applied (see FIG. 5)

Period of time t5 taken for a plasma to become extinct:
Becomes extinct after elapse of 30 ns after a laser beam has been applied (see FIG. 5)

Power density of a pulse: 1.7 J/cm$^2$

Pulse duration of a pulse: 10 μs

Overlapping ratio between pulses: 99.8%

According to the present embodiment, as described above, the application of the pulsed laser beams to a workpiece for forming grooves therein and the application of the pulsed laser beams to the workpiece for breaking growing debris and restraining melted debris from being produced can simultaneously be performed. Therefore, since the pulsed laser beams do not need to be applied for removing debris after laser-processed grooves have been formed in the workpiece, the productivity regarding the fabrication of devices from the workpiece is increased. Furthermore, since the heat generated in the workpiece is dissipated after the pulsed laser beams of a group have been applied to the workpiece until the pulsed laser beams of a next group are applied to the workpiece, the devices on the workpiece are prevented from being lowered in quality by the heat.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table for holding a workpiece thereon;
a laser beam applying unit for applying pulsed laser beams to the workpiece held on the chuck table; and
a feed mechanism for processing-feeding the chuck table and the laser beam applying unit relative to each other,
wherein the laser beam applying unit includes a laser oscillating mechanism for emitting the pulsed laser beams and a beam condenser for converging the pulsed laser beams emitted from the laser oscillating mechanism and applying the converged pulsed laser beams to the workpiece held on the chuck table, and
the laser oscillating mechanism includes
a group setting section for establishing the number of the pulsed laser beams to be applied to the workpiece until a time after which melted debris produced by the pulsed laser beams applied to the workpiece is solidified, and assigns the pulsed laser beams to a group, under conditions that, within a period of time which is shorter than a period of time in which the melted debris is produced from the workpiece by a pulsed laser beam applied to the workpiece, and within a period of time after which a plasma generated from the workpiece by the pulsed laser beam applied thereto becomes extinct, a next pulsed laser beam is applied to the workpiece to sustain the plasma uninterruptedly to break growing debris, and
a time interval setting section for establishing a time interval between the group and another group adjacent thereto as representing a period of time taken for heat generated by the application of the pulsed laser beams of the group to be dissipated, and also establishing time intervals between the pulsed laser beams of the group, the laser oscillating mechanism setting a repetitive frequency for each group of the pulsed laser beams as one unit.

2. The laser processing apparatus according to claim 1,
wherein the laser oscillating mechanism includes a plurality of laser diodes for emitting the pulsed laser beams,
the group setting section establishes the group of the pulsed laser beams to be emitted from the laser diodes, and
the time interval setting section controls a pulse delay generator to input signals to the laser diodes at desired time intervals, and also controls the pulse delay generator to input signals to the laser diodes to set the period of time taken for the heat generated in the workpiece by the application of the pulsed laser beams of the group thereto to be dissipated, as the time interval between the group and the other group adjacent thereto.

3. The laser processing apparatus according to claim 1,
wherein the laser oscillating mechanism includes a plurality of laser oscillators for emitting the pulsed laser beams,
the group setting section establishes the group of the pulsed laser beams to be emitted from the laser oscillators, and
the time interval setting section controls a delayed voltage generator to apply delayed voltages to the laser oscillators to cause the laser oscillators to emit the pulsed laser beams at desired time intervals, and also controls the delayed voltage generator to set the period of time taken for the heat generated in the workpiece by the application of the pulsed laser beams of the group thereto to be dissipated, as the time interval between the group and the other group adjacent thereto.

4. The laser processing apparatus according to claim 1, wherein the laser oscillating mechanism sets the repetitive frequency by decimating a predetermined number of groups from among the groups of the pulsed laser beams emitted in a second.

5. A laser processing method of processing a workpiece by using a laser processing apparatus having a laser oscillating mechanism that includes a group setting section for establishing a group of pulsed laser beams and a time interval setting section for establishing time intervals between the pulsed laser beams of the group, the laser oscillating mechanism setting a repetitive frequency for each group of the pulsed laser beams as one unit, the laser processing method comprising:
a groove forming step of forming grooves in the workpiece by way of ablation by applying the pulsed laser beams to the workpiece; and
a debris breaking and restraining step of breaking growing debris produced in the groove forming step and restraining melted debris from being produced in the groove forming step,
wherein, in order to simultaneously carry out the debris breaking and restraining step when the groove forming step is carried out,
the group setting section establishes the number of the pulsed laser beams of the group to be applied to the workpiece until a time after which the melted debris produced by the pulsed laser beams applied to the workpiece is solidified, under conditions that, within a period of time which is shorter than a period of time in which the melted debris is produced from the workpiece by a pulsed laser beam applied to the workpiece, and within a period of time after which a plasma generated from the workpiece by the pulsed laser beam applied thereto becomes extinct, a next pulsed laser beam is applied to the workpiece to sustain the plasma uninterruptedly to break the growing debris, and the interval setting section establishes a time interval between the group and another group adjacent thereto as representing a period of time taken for heat generated by the application of the pulsed laser beams of the group to be dissipated, and also establishing time intervals between the pulsed laser beams of the group.

6. The laser processing method according to claim 5,

Wherein, providing that the melted debris is produced after a period of time t1 and solidified after a period of time t2 after the pulsed laser beam has been applied to the workpiece, the time interval setting section establishes time intervals t3 between the pulsed laser beams of the group so as to satisfy $t3<t1$ and also to satisfy $t4<t3<t5$ where t4 represents a period of time taken for the plasma to be generated from the workpiece and t5 represents a period of time taken for the plasma to become extinct, and the group setting section establishes the number n of the pulsed laser beams of the group as an integral part of $n=(t2/t3)+1$.

* * * * *